Figure 1:
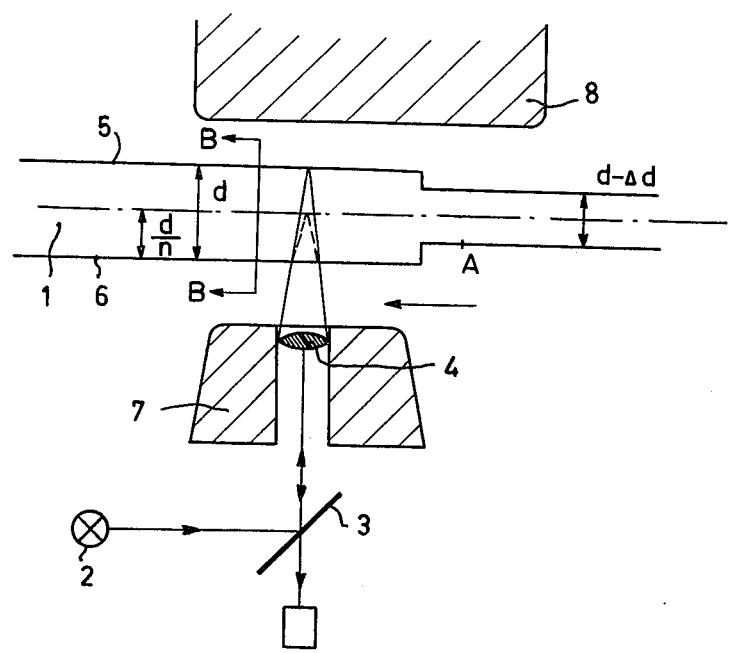

United States Patent

Bouwhuis

[11] 3,950,621
[45] Apr. 13, 1976

[54] APPARATUS FOR OPTICALLY READING A REFLECTING RECORD CARRIER

[75] Inventor: Gijsbertus Bouwhuis, Eindhoven, Netherlands

[73] Assignee: U.S. Philips Corporation, New York, N.Y.

[22] Filed: Nov. 7, 1974

[21] Appl. No.: 521,585

[30] Foreign Application Priority Data
Nov. 29, 1973  Netherlands............... 7316384

[52] U.S. Cl..................... 179/100.3 G; 179/100.3 L; 179/100.41 L
[51] Int. Cl.² .................. H04N 5/76; G11B 21/10
[58] Field of Search 179/100.3 E, 100.3 G, 100.3 B, 179/100.3 L, 100.41 L, 100.4 R, 274.41 R

[56] References Cited
UNITED STATES PATENTS
3,833,769  9/1974  Compaan et al............ 179/100.3 G
3,855,426  12/1974  Bouwhuis................... 179/100.3 G
3,876,842  4/1975  Bouwhuis................... 179/100.3 G Primary Examiner—Vincent P. Canney
Attorney, Agent, or Firm—Frank R. Trifari; Simon L. Cohen

[57] ABSTRACT

An apparatus is described for optically reading an information carrier, which carrier is provided with an optical structure in accordance with the information. Both at the top side and the underside of the carrier shoes are disposed, which together with said sides constitute air pads in such a way that the ratio of the rigidity of the air pad at the carrier side provided with the information to the rigidity of the air pad at the carrier side which faces away from the information is $1 : n-1$, $n$ being the refractive index of the carrier body.

2 Claims, 2 Drawing Figures

APPARATUS FOR OPTICALLY READING A REFLECTING RECORD CARRIER

The invention relates to an apparatus for optically reading a record carrier for information, for example picture and/or sound information, said carrier being provided with an optical structure in accordance with the information.

Such an information carrier has for example been proposed in the published Netherlands Pat. application No. 7,102,863 corresponding to U.S. Ser. No. 229,285, filed Feb. 25, 1972 now abandoned in favor of U.S. Ser. No. 396,399 filed Sept. 12, 1973. In another non-published Application an apparatus is proposed for reading a record carrier, on which carrier an additional radiation transmitting layer is provided. The radiation beam for reading the information first traverses said radiation-transmitting layer, is reflected at the optical structure which is covered with a metal film, again traverses the radiation transmitting layer and is passed to the detector. In the forward and return path of the radiation a lens is included which focusses the beam onto the carrier.

The radiation paths may be subject to slight variations, which may have different causes. For example, the surface of the carrier may not be perfectly flat or the thickness of the carrier may not be constant.

In yet another Application it has been proposed that, apart from the detector which intercepts the demodulated beam of radiation which emerges from the carrier, two additional detectors be incorporated in a suitable manner, which detectors produce electrical signals which are a measure of the variations of the distance from the lens to the carrier. The lens can be moved with the aid of said electrical signals.

It is an object of the invention to provide an apparatus for reading a record carrier in which the lens is not moved. It is especially suited for reading record carriers taking the form of a foil.

The invention is characterized in that both at the top side and the underside of the carrier, shoes are disposed which with said top side and underside constitute air pads, in such a way that the ratio of the rigidity of the air pad at the side of the carrier on which the information is stored to the rigidity of the air pad at the side of the carrier which faces away from the information is $1 : (n-1)$, n being the refractive index of the carrier body.

According to another feature the stationary lens is included in the shoe which is disposed opposite the carrier side which faces away from the information.

The invention is based on the recognition that an object which is located at a depth $d$ in a layer of a refractive index $n$ has an apparent distance of $d/n$ to the front of the layer.

Figure 2:
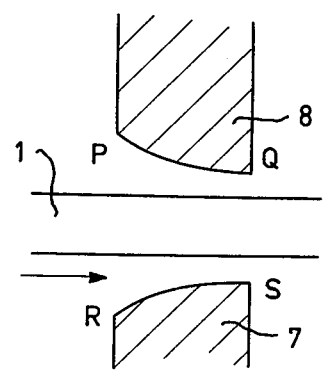

The invention will be explained with reference to the drawing, which in FIG. 1 shows a detail of the apparatus according to the invention and in FIG. 2 shows another detail.

In FIG. 1 the reference numeral 1 at an enlarged scale represents a part of a foil-shaped record carrier which with a high speed, for example with 1500 revolutions per minute, rotates about a spindle, not shown. The light beam which emerges from a radiation source 2, which may for example be a laser beam, via the semitransparent mirror 3 and the stationary lens 4 is aimed at the carrier part 1. The carrier has a thickness $d$. According to the Snell law of refraction the apparent thickness of the carrier is $d/n$, i.e. the information which in coded form, for example as described in U.S. patent application Ser. No. 344,863, filed Mar. 26, 1973 and now U.S. Pat. No. 3,893,163 issued July 1, 1975, is present at the upper surface 5 which is provided with a reflecting layer, appears to be disposed at a distance $d/n$ from the lower surface of the carrier.

The carrier is moved relative to the lens 4 in the direction indicated by the arrow. When A arrives at the location of the light beam, where the thickness of the carrier is $d - \Delta d$, the information at the upper surface is apparently disposed at a distance $$\frac{d - \Delta d}{n}$$

from the lower surface 6. In order to maintain the distance of the lens to the apparent plane of information constant, the lower surface 6 of the carrier should therefore be raised by a distance of $$\frac{d}{n} - \frac{(d - \Delta d)}{n} = \frac{\Delta d}{n}.$$

The upper surface 5 of the carrier is consequently lowered by $$\Delta d - \frac{\Delta d}{n} = \frac{(n-1)}{n}\Delta d.$$

In other words: the ratio of the thickness variation of the layer of air underneath the carrier, which layer is formed by the shoe 7 and the underside 6 of the carrier, to the thickness variation of the layer of air above the carrier, which layer is formed by the shoe 8 and the top of the carrier, equals $1 : n-1$. Said extremely thin layers of air serve as air pads. The thickness variations of said layers of air are known to be inversely proportional to the rigidities of the relevant air pads.

FIG. 2 shows a cross-section of the carrier part of FIG. 1 taken at the line B-B. An arrow indicates the direction of rotation of the carrier. In an embodiment the shoes 7 and 8 had cross-sections of approximately $5 \times 10$ mm$^2$. The average clearance from the shoes to the carrier was approx. 5 microns. The surface of the shoes was slightly curved towards the carrier in the direction of rotation of the carrier.

What is claimed is:

1. An apparatus for optically reading a record carrier for information, which carrier is provided with an reflective optical structure in accordance with the information, comprising an air bearing shoe both at the top side and the underside of the carrier, said air bearing shoes at the top and underside of the carrier comprising means for establishing the ratio of the rigidity of the air pad at the side of the carrier on which the information is stored to the rigidity of the air pad at the side of the carrier which faces away from the information at $1 : n-1$, n being the refractive index of the carrier body.

2. An apparatus as claimed in claim 1, wherein the stationary lens is included in the shoe which is disposed opposite the side of the carrier which faces away from the information.

* * * * *